(12) United States Patent
Kou et al.

(10) Patent No.: US 12,113,743 B2
(45) Date of Patent: Oct. 8, 2024

(54) HIGH RELIABILITY RADIO COMMUNICATIONS (71) Applicant: ZTE CORPORATION, Guangdong (CN)

(72) Inventors: Shuaihua Kou, Shenzhen (CN); Peng Hao, Shenzhen (CN); Wei Gou, Shenzhen (CN); Xianghui Han, Shenzhen (CN)

(73) Assignee: ZTE Corporation, Shenzhen (CN)

(*) Notice: Subject to any disclaimer, the term of this patent is extended or adjusted under 35 U.S.C. 154(b) by 499 days.

(21) Appl. No.: 17/369,156

(22) Filed: Jul. 7, 2021

(65) Prior Publication Data
US 2021/0336747 A1 Oct. 28, 2021

Related U.S. Application Data (63) Continuation of application No. PCT/CN2019/071463, filed on Jan. 11, 2019.

(51) Int. Cl.
H04L 5/00 (2006.01)
(52) U.S. Cl.
CPC .................. H04L 5/0053 (2013.01)
(58) Field of Classification Search
CPC ... H04L 5/0053; H04L 5/0051; H04L 5/0094; H04L 1/0003; H04L 1/22; H04L 5/0007; H04W 72/1268; H04W 72/23
See application file for complete search history.

(56) References Cited

U.S. PATENT DOCUMENTS

| 2013/0223356 A1* | 8/2013 | Khoshnevis | H04W 72/23 370/329 |
| 2018/0279327 A1 | 9/2018 | Ying et al. | |
| 2020/0396029 A1* | 12/2020 | Baldemair | H04L 5/0055 |

FOREIGN PATENT DOCUMENTS

| CN | 102148672 A | 8/2011 |
| CN | 106712921 A | 5/2017 |
| CN | 106998245 A | 8/2017 |
| CN | 108401485 A | 8/2018 |
| CN | 108811094 A | 11/2018 |
| CN | 109417447 A | 3/2019 |

OTHER PUBLICATIONS

CATT, "HARQ and scheduling timing design for LTE sTTI" 3GPP TSG RAN WG1 Meeting #88, R1-1702056, Feb. 17, 2017, Athens, Greece (5 pages).
CMCC, "Downlink HARQ-ACK feedback timing", 3GPP TSG RAN WG1 Meeting #88bis, R1-1705106, Spokane, WA, Mar. 24, 2022 (4 pages).
(Continued)

Primary Examiner — Dinh Nguyen
(74) Attorney, Agent, or Firm — Foley & Lardner LLP (57) ABSTRACT In one aspect a wireless communications method is disclosed. The method includes transmitting, from a first radio terminal to a second radio terminal, control information or payload data, wherein the receiving and a preparation is completed at a first time. The method further includes receiving, from the second radio terminal, feedback information at an interval later than a last symbol of the transmitted control information or payload data, wherein the interval is pre-defined by a protocol or configured by a network parameter.

16 Claims, 8 Drawing Sheets

402 — Transmitting, from a first radio terminal to a second radio terminal, control information or payload data, wherein the receiving and a feedback preparation is completed at a first time.

404 — receiving, from the second radio terminal, feedback information at an interval later than a last symbol of the transmitted control information or payload data, wherein the interval is pre-defined by a protocol or configured by a network parameter.

(56) References Cited

OTHER PUBLICATIONS

First CN Office Action on CN 201980088786.8 dated Jun. 1, 2022 (13 pages, including English translation).
Nokia et al., "DL HARQ-ACK feedback and UL Scheduling for FS2 with 1-ms TTI" 3GPP TSG-RAN WG1 Meeting #88, R1-1701996, Feb. 17, 2017, Athens, Greece (5 pages).
ZTE, "Remaining issues on SR with HARQ-ACK in FeNB-IoT" 3GPP TSG-RAN2 meeting#103, R2-1812033, Aug. 24, 2018, Gothenburg, Sweden (3 pages).
International Search Report and Written Opinion for PCT Appl. No. PCT/CN2019/071463, mailed Oct. 8, 2019 (6 pages).
Ericsson, "Summary of 7.1.6 Maintenance for URLLC", 3GPP TSG RAN WG1 Meeting #94, R1-1809784, Aug. 24, 2018, Goteborg, Sweden (34 pages).
Office Action for KR Appl. No. 10-2021-7025285, dated Apr. 24, 2024 (with English translation, 6 pages).

\* cited by examiner

HIGH RELIABILITY RADIO COMMUNICATIONS

CROSS-REFERENCE TO RELATED APPLICATIONS

This application claims the benefit of priority under 35 U.S.C. § 120 as a continuation of PCT Patent Application No. PCT/CN2019/071463, filed on Jan. 11, 2019, the disclosure of which is incorporated herein by reference in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity, connectivity, and reliability. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This document discloses methods, systems, apparatuses, and computer readable media related to wireless communication, and in particular to a method and apparatus for reducing the time interval between transmissions, for example, reducing the time interval between a downlink transmission and a corresponding uplink transmission.

In one aspect, a method of wireless communication is disclosed. The method includes transmitting, from a first radio terminal to a second radio terminal, control information or payload data, wherein the receiving and a feedback preparation is completed at a first time. The method further includes receiving, from the second radio terminal, feedback information at an interval later than a last symbol of the transmitted control information or payload data, wherein the interval is pre-defined by a protocol or configured by a network parameter.

In another aspect, a wireless communications method is disclosed. The method includes receiving, at a second radio terminal from a first radio terminal, control information or payload data, wherein the receiving and a feedback preparation is completed at a first time. The method further includes transmitting, from the second radio terminal, feedback information at an interval later than a last symbol of the received control information or payload data, wherein the interval is pre-defined by a protocol or configured by a network parameter.

The details of one or more implementations are set forth in the accompanying attachments, the drawings, and the description below. Other features will be apparent from the description and drawings, and from the claims.

DETAILED DESCRIPTION

Section headings are used in the present document only to improve readability and do not limit scope of the disclosed embodiments and techniques in each section to only that section.

The 5G new radio (NR) supports at least three service models including enhanced mobile broadband (eMBB), ultra-reliable low latency communications (URLLC), and massive machine type communications (mMTC). URLLC is targeted toward high reliability and low latency with transmission reliability of 99.999% or more, and transmission delay of less than 1 millisecond (ms). Under normal circumstances, it is difficult to achieve such high reliability in a single transmission. Use of a hybrid automatic repeat request (HARQ) retransmission does not cause a large amount of air interface resources to be wasted but will increase the delay of the transmission. According to the fastest user equipment (UE) processing capability specified in the NR, in some scenarios, the HARQ retransmission cannot be completed in 1 ms, thereby failing to satisfy the URLLC. The disclosed subject matter can be used to reduce the transmission delay by reducing the interval between control or data received by the UE and corresponding feedback, such as the interval between uplink data and the downlink control.

Figure 1A:
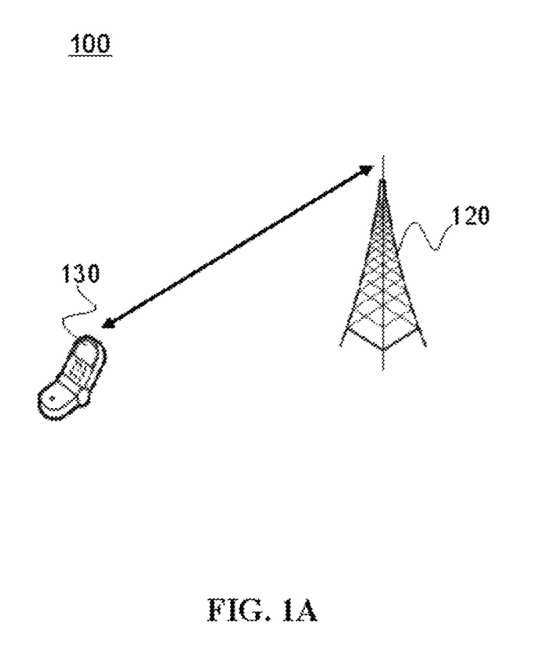
FIG. 1A depicts an example of a system, in accordance with some example embodiments.

FIG. 1A depicts a system 100, in accordance with some example embodiments. System 100 includes a user equipment (UE) 130 in communication with a base station 120. The disclosed subject matter may be included at the UE 130 and/or base station 110 to enable communications including eMBB, URLLC, and mMTC. The base station may be a next generation node B (gNB), enhanced Node B (eNB) or other base station.

In a wireless communication system, a protocol may pre-specify or the network may configure some network resources as a physical downlink control channel (PDCCH) resource for transmitting downlink control. For example, the first few OFDM symbols of a slot may be configured as a control resource area, i.e. control region. The control resource area may include at least one PDCCH candidate resource. Each PDCCH candidate resource may have a unique number to identify the candidate resource, and one PDCCH may be sent on one PDCCH candidate resource. One PDCCH candidate resource may contain one or more control channel elements (CCEs), each CCE having a unique number to identify the CCE. A CCE, in turn, may include several resource element groups (REGs), each REG having a unique number to identify the REG. One REG may include several resource elements (REs), and within a slot each RE has a unique orthogonal frequency division multiplexing (OFDM) symbol number and subcarrier number to identify the RE. The network may be a base station or other network element.

In the wireless communication information, the downlink control information (DCI) that schedules the UE to transmit the physical uplink shared channel (PUSCH) may include one or more of the following fields: a DCI format indication, a frequency domain resource indication, a time domain resource indication, a frequency hopping flag, a modulation and coding scheme (MCS), a new data indication, a redundancy version (RV), a HARQ process number, a PUSCH transmission power control command, a uplink (UL)/supplementary uplink (SUL) indication, one or more padding bits, a carrier indication, a bandwidth part (BWP) indication, a first downlink assignment index, a second downlink assignment index, a sounding reference signal (SRS) resource indication, precoding information and a number of layers, antenna ports, a SRS request, a channel state information (CSI) request, a code block group (CBG) transmission information, a phase tracking reference signal-demodulation reference signal (PTRS-DMRS) association, a beta_offset indication, a demodulation reference signal (DMRS) sequence initialization, and/or an uplink shared channel (UL-SCH) indication. Which fields exist may depend on the configuration of the network.

Example 1

In this example, the network sends a first PDCCH to the UE, where the first PDCCH indicates resource information that may be used for sending a second PDCCH. After the UE receives the first PDCCH sent by the network, in each PDCCH monitoring occasion, the UE blindly detects the second PDCH on the resource indicated by the resource information in the first PDCCH. A PDCCH monitoring occasion is a time when the UE performs PDCCH blind detection using the indication in the first PDCCH. For example, UE perform PDCCH blind detection in each slot. Then a slot can be seen as an occasion. The resource information may be at least one of the following: time-frequency resource information, a PDCCH candidate resource information, CCE resource information, REG resource information, and the like. The time-frequency resource information may indicate a time-frequency resource for transmitting the PDCCH, such as several OFDM symbols and/or several sub-carriers in the control region. The PDCCH candidate resource information indicates which candidate resources in the control region may be used for transmitting PDCCH, and the PDCCH candidate resource information may be a PDCCH candidate resource number or a PDCCH candidate set number, where the PDCCH candidate set number represents one PDCCH candidate resource set and one PDCCH candidate resource set includes several PDCCH candidate resources. The CCE resource information indicates which CCEs in the control resource region may be used to send the PDCCH, and the CCE resource information may be a CCE number or a CCE set number, where one CCE set may include several CCEs. The REG resource information may indicate which REGs in the control region will send the PDCCH, and the REG resource information may be a REG number or a REG set number, where one REG set includes several REGs.

The first PDCCH may indicate at least a starting resource information for the UE to blindly detect PDCCH, and after the UE receives the first PDCCH sent from the network, the UE starts PDCCH blind detection from the starting resource indicated by the starting resource information in the first PDCCH in each PDCCH monitoring occasion. In other words, the UE may preferentially blindly the PDCCH transmitted on the starting resource in each PDCCH monitoring occasions. The starting resource information may be at least one of the following: time-frequency location information, PDCCH candidate resource information, CCE resource information, REG resource information, and the like. The time-frequency resource may be an OFDM number and/or a subcarrier number, such that the UE preferentially detects the PDCCH that may be transmitted on the indicated OFDM number and/or the subcarrier number; the PDCCH candidate resource information may be a candidate resource number. In this way, the UE may preferentially check the PDCCH transmitted on the candidate resource; the CCE resource information may be a CCE number, so that the UE may preferentially check the PDCCH that may be sent on the CCE; the REG may be a REG number, so that the UE may preferentially check the possible PDDCH transmitted on the REG. UE may perform PDCCH detection in the order of PDCCH candidate resource number, or CCE number, or REG number, or OFDM symbol/subcarrier/RB number. Further, the number of PDCCHs for each blind check of the UE, or the number of PDCCH candidate resources, the number of CCEs, and the number of REGs of the blind may be pre-defined by the protocol or configured by network. For example, if the maximum number is N, then UE only blindly detect N PDCCH or the PDCCH on N PDCCH candidate resources/CCE/REG in each PDDCH monitoring occasions. The value of N may be pre-defined by the protocol or configured by the radio resource control (RRC) signaling, the MAC CE, and the DCI of the first PDCCH transmitted by the network.

Example 2

In a second example, the network configures at least the following information in the RRC signaling and/or the first PDCCH: the MCS of the PUSCH, the RV, the precoding information and the number of layers, and the resource size allocated to the PUSCH. Then the network sends the second PDCCH to the UE. The second PDCCH may not include a field that has been configured by the RRC signaling or the first PDCCH. If the second PDCCH includes the same field as the RRC signaling or the first PDCCH, the values of the same fields are the same. The UE transmits the PUSCH according to the scheduling information of the first PDCCH and the second PDCCH or the scheduling information of the RRC signaling and the second PDCCH.

Further, the first PDCCH or the RRC signaling indicates the resource size of the PUSCH, such as the number of OFDM symbols and/or the number of subcarriers/resource blocks (RBs) occupied by the PUSCH, and the resource location indicating the PUSCH in the second PDCCH. The indication of the location may be a start location/end location, and the time domain start/end location may be an OFDM symbol/slot number, a frequency domain start/end location subcarrier/RB number, and the like.

After the UE receives the first PDCCH and/or RRC signaling sent by the network, the UE prepares uplink data according to the indication in the first PDCCH and/or RRC when the UE has uplink data to be sent. For example, UE may perform coding, scrambling, modulation, layer mapping and the like. After receiving the second PDCCH sent by the network, the UE may further process and transmits the uplink data according to the scheduling information of the second PDCCH.

Further, the first PDCCH may indicate several sizes of resource for PUSCH. The second PDCCH indicates which resource size are used for PUSCH.

Example 3

In a third example, the network configures at least one of a search space, a control resource set configuration, and a DCI format of the first PDCCH. The second PDCCH is configured with a different configuration, and the UE distinguishes the first PDCCH from the second PDCCH according to different configurations. Specifically, the control resource set configuration includes at least a frequency domain resource location. The search space includes at least a PDCCH blind detection time, an radio network temporary identifier (RNTI) value, DCI format, and the like. The PDCCH blind detection time may include a blind detection period and an offset value. The UE distinguishes the first PDCCH from the second PDCCH by using at least one of the foregoing.

When the configuration information of the first PDCCH and the second PDCCH are the same, the first PDCCH and the second PDCCH are distinguished by the value of the field in the DCI. Specifically, the value of one or several fields in the DCI is set to a special value to indicate whether the PDCCH is the first PDCCH or the second PDCCH. A new field may be used to indicate the first PDCCH and the second PDCCH. For example, a new field with value 1 may indicate that the PDCCH is the first PDCCH, and a value of 0 indicates that the PDCCH is the second PDCCH.

Example 4

In a fourth example, after receiving the PDCCH for scheduling the PUSCH, the UE performs PDCCH reception processing and PUSCH preparation for a period of time before transmitting the PUSCH. For example, the processing time of the UE may be N1, N2, where N2 is less than N1. Then, when at least one of the following is satisfied, the time interval between the last OFDM symbol of the PDCCH and the first OFDM symbol of the PUSCH scheduled by it can be calculated using N2. In some example embodiments, when all the following are not satisfied, the time interval between last OFDM symbol of the PDCCH and the first OFDM symbol of the PUSCH scheduled by it can be calculated using N1.

When at least one of MCS, RV, precoding information and the number of layers and the resource size information indicating the PUSCH are not indicated in the PDCCH for scheduling, the PUSCH and/or the information are included in a first PDCCH or RRC signaling.

When the first type of information indicated in the second PDCCH is the same as the corresponding information of the first PDCCH or the RRC signaling configuration, where the first type of information includes at least an MCS, an RV, a precoding information and the number of layers, and a PUSCH resource size.

When the configuration information indicated in the second PDCCH and the information configured by the first PDCCH or the RRC signaling are all the same except for the second type information, where the second type information includes at least a resource location, a DMRS location, an analog beam, or a SRS resource indication.

When the first PDCCH or RRC signaling configure the resource or the starting resource for sending the second PDCCH.

When the third PDCCH and the third PDCCH scheduled PUSCH and/or the semi-statically configured PUSCH are not present between the second PDCCH and its scheduled PUSCH.

When the time interval between the last OFDM symbol of the PDCCH and the first OFDM symbol of its scheduled PUSCH is less than N1 or less than the value calculated by N1, the UE wishes to satisfy at least one of the following conditions:

At least one of MCS, RV, precoding information and the number of layers and the resource size information indicating the PUSCH are not indicated in the PDCCH for scheduling the PUSCH and/or the information are included in a first PDCCH or RRC signaling;

The first type information indicated in the second PDCCH is the same as the corresponding information of the first PDCCH or the RRC signaling configuration, where the first type information includes at least an MCS, an RV, a precoding information and the number of layers, and a PUSCH resource size.

The configuration information indicated in the second PDCCH and the information configured by the first PDCCH or the RRC signaling are all the same except for the second type information, where the second type information includes at least a resource location, a DMRS location, and an analog beam, a SRS resource indication.

The first PDCCH or RRC signaling configure the resource or the starting resource for sending the second PDCCH.

The third PDCCH and the third PDCCH scheduled PUSCH and/or the semi-statically configured PUSCH are not present between the second PDCCH and its scheduled PUSCH.

Example 5

Figure 1B:
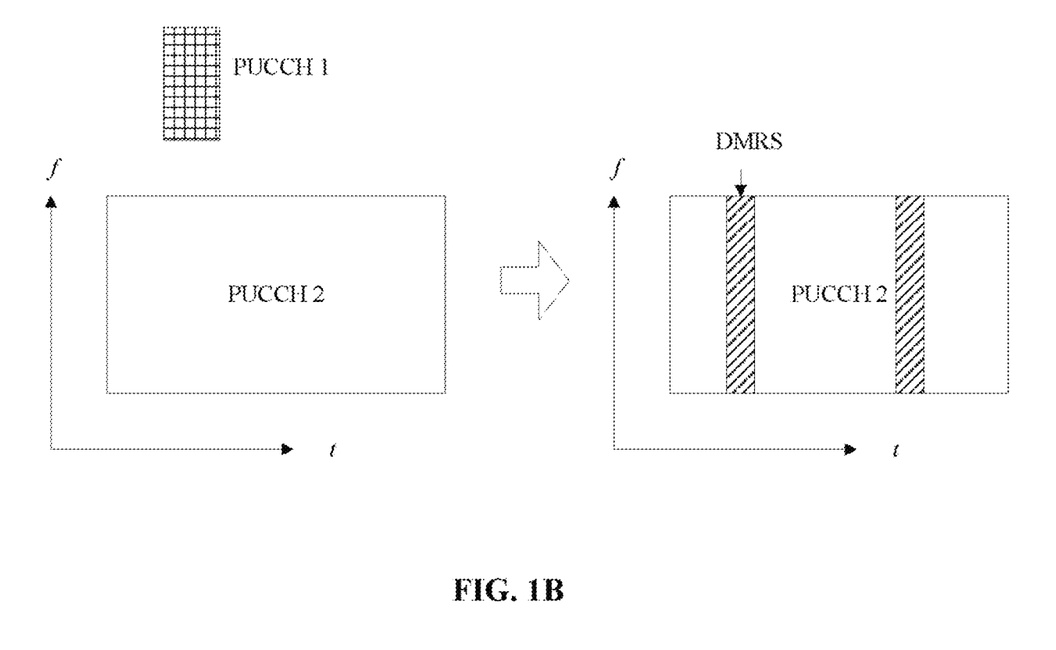
FIG. 1B depicts an example where a first control channel and a second control channel overlap each other, in accordance with some example embodiments.

A fifth example is shown in FIG. 1B where PUCCH 1 and PUCCH 2 overlap with each other, and the PUCCH 1 transmits only 1 bit or 2 bits of information. In this case, the 1-bit or 2-bit information of the PUCCH 1 is carried on the DMRS of PUCCH 2, and only PUCCH 2 is transmitted. Specifically, at least one of a DMRS sequence initialization value, a DMRS sequence cyclic shift, and a scrambled orthogonal sequence of PUCCH 2 may be used to represent information bits in the PUCCH 1. For example, if PUCCH 1 only transmits 1-bit information, then information bit 0 is represented by the DMRS sequence initialization value 1 of the PUCCH 2, and information bit 1 is represented by the DMRS sequence initialization value 2 of the PUCCH 2. If PUCCH 1 transmits 2-bit information, then its information bit 00 is represented by the combination of the first cyclic shift of the DMRS sequence of PUCCH 2 and the first type of scrambled orthogonal sequence, and information bit 01 is represented by the combination of the first cycle shift of DMRS sequence of PUCCH 2 and the second type of scrambled orthogonal sequence. The remaining bit information from PUCCH 1 (such as 10, 11) uses a similar method. For example, 10 may be represented by the combination of the second cyclic shift of the DMRS sequence of PUCCH 2 and the first type of scrambled orthogonal sequence and 11 may be represented by the combination of the second cyclic shift of the DMRS sequence of PUCCH 2 and the second type of scrambled orthogonal sequence. The information bits and the second scrambling orthogonal sequence may be analogous. The correspondence between the information bit in the PUCCH 1 and the combination of sequence initialization value, the cyclic shift and the scrambled orthogonal sequence are predetermined by the protocol or configured by the network.

Example 6

Figure 2:
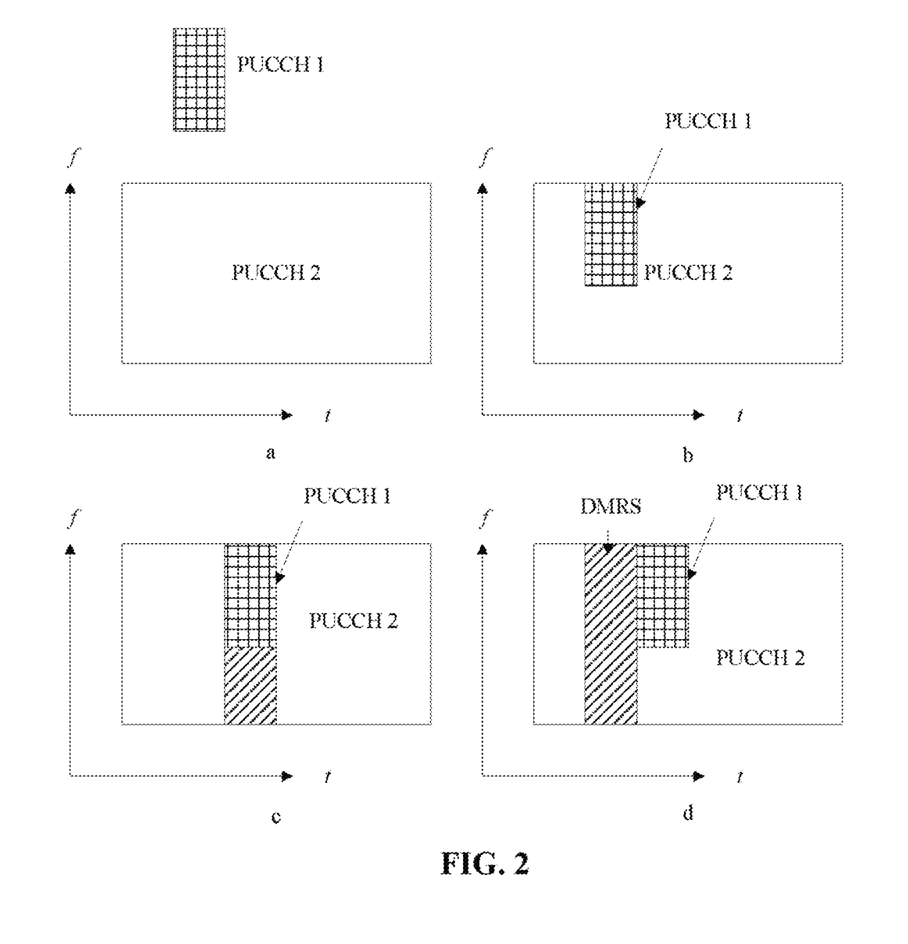
FIG. 2 depicts various arrangements of a first and second control channel, in accordance with some example embodiments.

A sixth example is shown in FIGS. 2a-2d. As shown in FIG. 2a, PUCCH 1 and PUCCH 2 overlap in the time domain, the frequency domain resource positions are different, and PUCCH 1 uses PUCCH format 0, then the UE transmits PUCCH 1 and PUCCH 2 at the same time or nearly the same time according to one or more of the following propositions:

Proposition 1: Change the transmission resource of PUCCH 1 and send it on a new resource. The new time-frequency resource is the same as the time domain resource of the original PUCCH 1, and the new frequency domain resource is the same as the frequency domain resource of PUCCH 2 or the new frequency domain resource of PUCCH 1 is located within the frequency domain of PUCCH 2. Further, the highest or lowest subcarrier number of the new PUCCH 1 resource and the PUCCH 2 resource are the same. In PUCCH 2, the data or the DMRS originally mapped to the time-frequency resource occupied by PUCCH 1 is destroyed, and the symbols at other resource locations of PUCCH 2 are normally transmitted, as shown in FIG. 2b.

Proposition 2: If PUCCH 2 transmits DMRS on the symbol where PUCCH 1 is located, then PUCCH 1 and PUCCH 2 are transmitted according to proposition 1. If PUCCH 2 transmits data on the symbol where PUCCH 1 is located, the new time domain resource of PUCCH 1 is the first DMRS symbol of PUCCH 2 following the data symbol where PUCCH 1 is located, the new frequency domain resource is obtained as described in proposition 1, and then PUCCH 1 is transmitted on the new time-frequency resource. In PUCCH 2, the DMRS originally mapped to the time-frequency resource occupied by PUCCH 1 is destroyed, and the symbols are normally transmitted at other resource locations of the PUCCH 2, as shown in FIG. 2c.

Proposition 3: If PUCCH 2 transmits data on the symbol where PUCCH 1 is located, then PUCCH 1 and PUCCH 2 are transmitted according to proposition 1. If PUCCH 2 transmits DMRS on the symbol where PUCCH 1 is located, the new time domain resource of PUCCH 1 is the first data symbol position in PUCCH 2 following the DMRS symbol where PUCCH 1 is located, and the new frequency domain resource is obtained according to the description in proposition 1, and then PUCCH 1 is sent on the new time-frequency resource. The data originally mapped to the time-frequency resource occupied by PUCCH 1 in PUCCH 2 is destroyed, and the symbols are normally transmitted at other resource locations of PUCCH 2, as shown in FIG. 2d.

Proposition 4: According to proposition 2 or proposition 3, PUCCH 1 resource will be postponed. The time domain resource of the new PUCCH 1 is different from the time domain resource of the original PUCCH 1 by less than or equal to M OFDM symbols. PUCCH 1 and PUCCH 2 are transmitted according to proposition 2 and proposition 3. Otherwise, proposition 1 is used to transmit PUCCH 1 and PUCCH 2 or only PUCCH 1 is transmitted. The value of M is pre-specified by the protocol or configured by the network.

Proposition 5: The MCS of PUCCH 2 or the ratio of the resource size of PUCCH 1 to the resource size of PUCCH 2 is lower than T, then PUCCH 1 and PUCCH 2 are transmitted according to proposition 1 or proposition 3. Otherwise, proposition 2 is used to transmit PUCCH 1 and PUCCH 2 or only PUCCH 1 is transmitted. The value of T is pre-specified by the protocol or configured by the network.

Example 7

Figure 3:
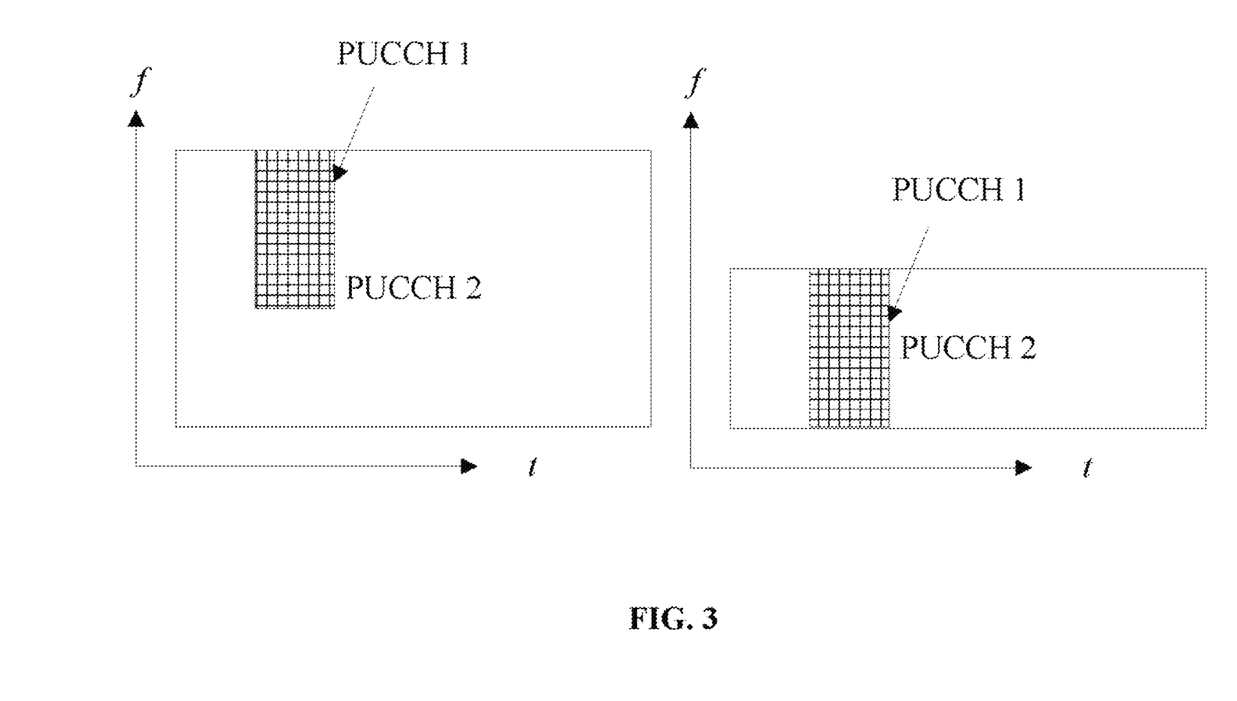
FIG. 3 depicts additional arrangements of a first and second control channel, in accordance with some example embodiments, in accordance with some example embodiments.

A seventh example is shown in FIG. 3. As shown in FIG. 3, when the time domain resource of PUCCH 1 overlaps with the time domain resource of PUCCH 2, and the frequency domain resource is the same or the frequency domain resource of PUCCH 1 is located within the frequency domain of PUCCH 2, according to Example 6 the time domain resource of the new PUCCH 1 is obtained, and the frequency domain resource of the PUCCH 1 remains unchanged, and then the PUCCH 1 is transmitted on the resource of the new PUCCH 1. The symbols originally mapped to the time-frequency resource occupied by PUCCH 1 in PUCCH 2 is destroyed, and the symbols on the other resource locations of PUCCH 2 are normally sent. Proposition 4 and proposition 5 in Example 6 can also be used in this case.

Example 8

After receiving the PDCCH and the scheduled physical downlink shared channel (PDSCH), the UE performs PDCCH and PDSCH processing and corresponding PUCCH preparation for a period of time before transmitting the PUCCH. For example, the processing time of UE may be N3, N4, where N4 is less than N3. Then, when at least one of following is satisfied, the time interval between the last OFDM symbols of the PDSCH or PDCCH and the first OFDM symbols of the corresponding PUCCH can be calculated using N4. In some example embodiments, when all the following are not satisfied, the time interval between the last OFDM symbols of the PDSCH or PDCCH and the first OFDM symbols of the corresponding PUCCH can be calculated using N3.

When UE is configured to transmitted PUCCH according to Example 6 or Example 7.

When the first PDCCH or RRC signaling configure the resource or the starting resource for sending the second PDCCH.

When the time interval between the last OFDM symbols of the PDSCH or PDCCH and the first OFDM symbols of the corresponding PUCCH is less than N3 or less than the value calculated by N3, the UE wishes to satisfy at least one of the following conditions:

UE is configured to transmitted PUCCH according to Example 6 or Example 7.

The first PDCCH or RRC signaling configure the resource or the starting resource for sending the second PDCCH.

Figure 4:
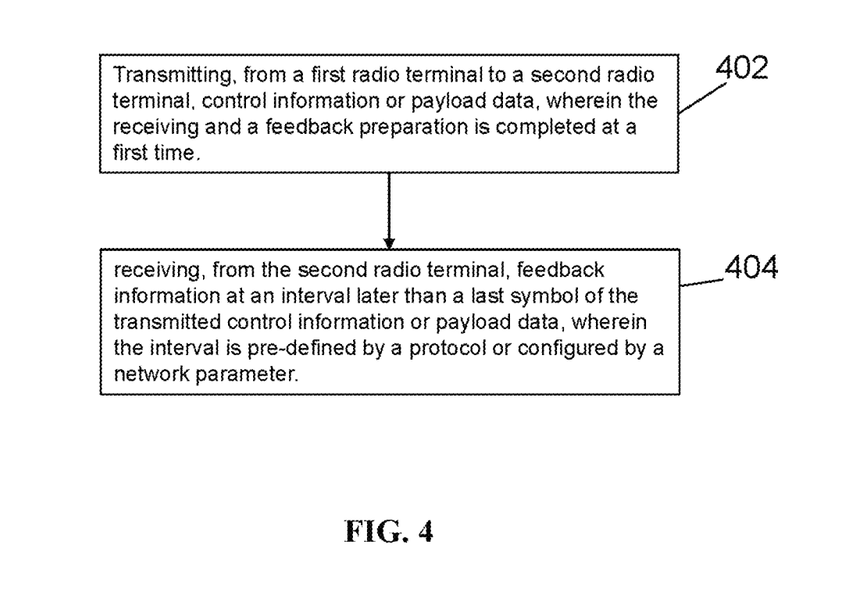
FIG. 4 depicts an example of a process, in accordance with some example embodiments.

FIG. 4 depicts a process, in accordance with some example embodiments. The process includes a method of wireless communication. At 402, the method includes transmitting, from a first radio terminal to a second radio terminal, control information or payload data, wherein the receiving and the feedback preparation is completed at a first time. At 404, the method includes receiving, from the second radio terminal, feedback information at an interval later than a last symbol of the transmitted control information or payload data, wherein the interval is pre-defined by a protocol or configured by a network parameter.

Figure 5:
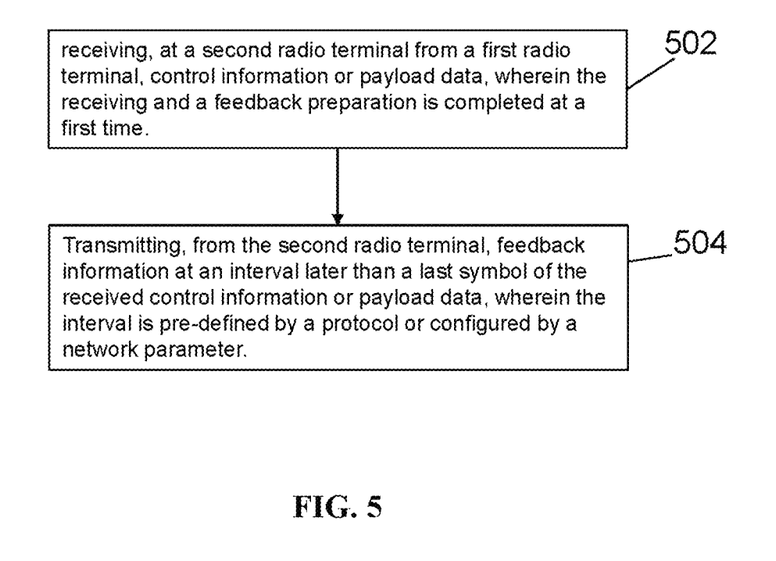
FIG. 5 depicts another example of a process, in accordance with some example embodiments.

FIG. 5 depicts a process, in accordance with some example embodiments. The process includes a method of wireless communication. At 502, the method includes receiving, at a second radio terminal from a first radio terminal, control information or payload data, wherein the receiving and the feedback preparation is completed at a first time. At 504, the method includes transmitting, from the second radio terminal, feedback information at an interval later than a last symbol of received control information or payload data, wherein the interval is pre-defined by a protocol or configured by a network parameter.

Figure 6:
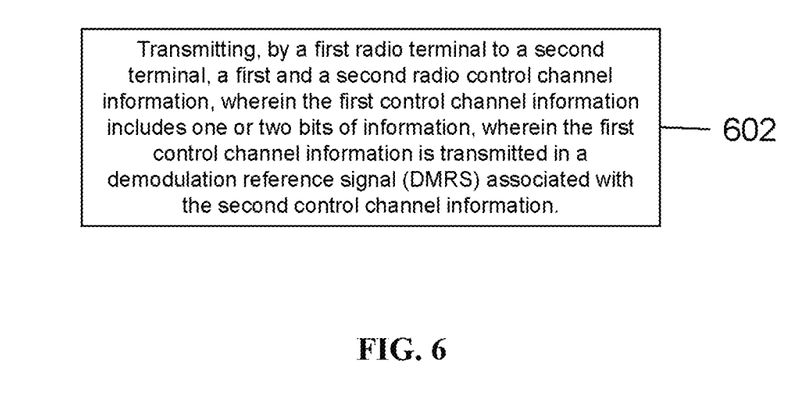
FIG. 6 depicts another example of a process, in accordance with some example embodiments.

FIG. 6 depicts a process, in accordance with some example embodiments. The process includes a method of wireless communication. At 602, the method includes transmitting, by a first radio terminal to a second terminal, a first and a second radio control channel information, wherein the first control channel information includes one or two bits of information, wherein the first control channel information is transmitted in a DMRS associated with the second control channel information.

Figure 7:
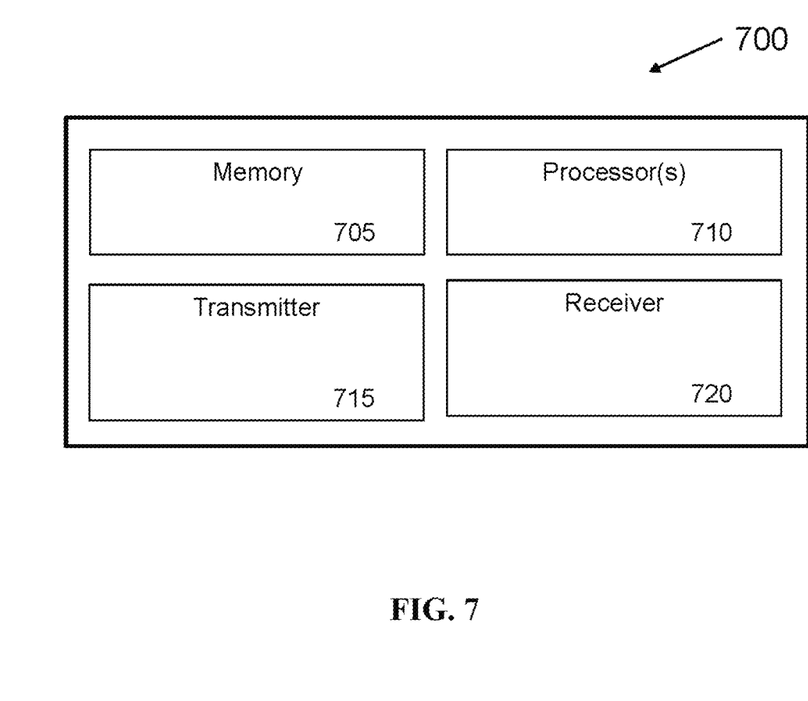
FIG. 7 depicts an apparatus, in accordance with some example embodiments.

FIG. 7 depicts a block diagram 700 representing of a portion of a radio station. A radio station 700 such as a base station or a wireless device (or UE) can include one or more processors 710 such as a microprocessor that implements one or more of the wireless techniques presented in this document. The radio station 700 can include transmitter electronics 715 to send and receiver electronics 720 to receive wireless signals over one or more communication interfaces such as an antenna. The radio station 700 can include other communication interfaces for transmitting and receiving data. Radio station 700 can include one or more memories 705 configured to store information such as data and/or instructions. In some implementations, the processor electronics 710 can include at least a portion of the transceiver electronics 720/715. In some embodiments, at least some of the disclosed techniques, modules or functions are implemented using the radio station 700.

The following examples are not intended to be limiting. Although specific communications equipment is listed, other equipment may be used in their place. In some example embodiments, the second radio terminal is a base station such as an enhanced node B (eNB) or a next generation node B (gNB) or another base station. The first radio terminal may be a user equipment, mobile terminal, handset, smartphone, cell phone, or other mobile device.

SUMMARY

The following summarizes some aspects of the disclosed subject matter.

The interval between the uplink feedback of the LTE and its corresponding downlink control and/or data may be a threshold 1 that is pre-defined by a protocol or configured on the network.

When at least one of MCS, RV, precoding information and the number of layers and the resource size information indicating the PUSCH are not indicated in the PDCCH for scheduling; the PUSCH and/or the information are included in a first PDCCH or RRC signaling.

Or, when the first type information indicated in the second PDCCH is the same as the corresponding information of the first PDCCH or RRC signaling configuration, where the first type information includes at least MCS, RV, precoding information and the number of layers, PUSCH Resource size.

Or, when the configuration information indicated in the second PDCCH and the information configured by the first PDCCH or the RRC signaling are all the same except for the second type information, where, the second type information includes at least the resource location, the DMRS location, analog beam, an SRS resource indication.

When the first PDCCH or RRC signaling configure the resource or the starting resource for sending the second PDCCH.

Configuring at least the resource or the starting resource for sending the second PDCCH in the first PDCCH.

Configuring at least the MCS, RV, precoding information and layer number of the PUSCH and the resource size allocated to the PUSCH in the first PDCCH or RRC signaling.

If the uplink feedback of the UE is the first PUCCH, and the first PUCCH overlaps with the second PUCCH time domain.

Using the DMRS of the second PUCCH to carry the uplink control information (UCI) of the first PUCCH, the bit information in PUCCH 1 is represented by a combination of at least the DMRS sequence initialization value, the DMRS sequence cyclic shift and the scrambled orthogonal sequence of DMRS for PUCCH 2.

The first PUCCH is transmitted at the location of the second PUCCH, and the partial data or DMRS of the second PUCCH is destroyed.

The following clauses recite features of various implementations.

Clause 1. A wireless communications method, comprising: transmitting, from a first radio terminal to a second radio terminal, control information or payload data, wherein the receiving and a feedback preparation is completed at a first time; and receiving, from the second radio terminal, feedback information at an interval later than a last symbol of the transmitted control information or payload data, wherein the interval is pre-defined by a protocol or configured by a network parameter.

Clause 2. The wireless communications method of clause 1, further comprising: configuring, by the first radio terminal, one or more values for one or more parameters in a first radio control channel information sent to the second radio terminal; and transmitting a second radio control channel information to the second radio terminal, wherein the second radio control channel information excludes the one or more parameters or includes the one or more values.

Clause 3. The wireless communications method of clause 2, wherein the one or more parameters include includes a modulation and coding scheme (MCS) for a shared channel.

Clause 4. The wireless communications method of clause 2, wherein the one or more parameters includes a redundancy version (RV).

Clause 5. The wireless communications method of clause 2, wherein the one or more parameters includes precoding and a number of layers.

Clause 6. The wireless communications method of clause 2, wherein the one or more parameters includes a resource size allocated to a shared channel.

Clause 7. The wireless communications method of clause 2, wherein the shared channel is a physical uplink shared channel (PUSCH).

Clause 8. The wireless communications method of clause 2, wherein the first radio control channel is a physical downlink control channel (PDCCH).

Clause 9. The wireless communications method of clause 2, wherein the first radio control channel is a radio resource control (RRC) signaling.

Clause 10. The wireless communications method of clause 1, further comprising: transmitting, by the first radio terminal to the second radio terminal, first radio control channel information, wherein the first control channel information indicates resource information for resources available in a second radio control channel.

Clause 11. The wireless communications method of clause 10, wherein the resource information includes a time-frequency resource.

Clause 12. The wireless communications method of clause 10, wherein the resource information includes candidate control channel information.

Clause 13. The wireless communications method of clause 10, wherein the resource information includes control channel element (CCE) resource information.

Clause 14. The wireless communications method of clause 10, wherein the resource information includes resource element group (REG) information.

Clause 15. A wireless communications method, comprising: transmitting, by a first radio terminal to a second terminal, a first and a second radio control channel information, wherein the first control channel information includes one or two bits of information, wherein the first control channel information is transmitted in a demodulation reference signal (DMRS) associated with the second control channel information.

Clause 16. The wireless communications method of clause 15, wherein the DMRS includes a DMRS sequence.

Clause 17. The wireless communications method of clause 15, wherein the DMRS includes a DMRS sequence cyclic shift value.

Clause 18. The wireless communications method of clause 15, wherein the DMRS includes a scrambled orthogonal sequence.

Clause 19. A wireless communications method, comprising: receiving, at a second radio terminal from a first radio terminal, control information or payload data, wherein the receiving and a feedback preparation is completed at a first time; transmitting, from the second radio terminal, feedback information at an interval later than a last symbol of the received control information or payload data, wherein the interval is pre-defined by a protocol or configured by a network parameter.

Clause 20. The wireless communications method of clause 19, further comprising: receiving, from the first radio terminal, values for configuring one or more parameters in a first radio control channel sent to the second radio terminal; and receiving a second radio control channel information from the first radio terminal, wherein the second radio control channel information excludes the one or more parameters or includes the one or more values.

Clause 21. The wireless communications method of clause 19, further comprising: receiving, by the second radio terminal, first radio control channel information, wherein the first control channel information indicates resource information for resources available in a second radio control channel, wherein the second radio terminal blindly detects the second radio control channel using the indicated resources available in the second control channel.

Clause 22. The wireless communications method of any of clauses 1 to 20, wherein the first radio terminal is a base station, and second radio terminal is a user equipment, Clause 23. An apparatus comprising a processor configured to implement a method recited in one or more of clauses 1 to 21.

Clause 24. A computer program product having code stored thereon, the code, when executed by a processor, causing the processor to implement a method recited in one or more of clauses 1 to 21.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communications method, comprising:
   transmitting, from a first radio terminal to a second radio terminal, a first radio control channel information;
   transmitting, from the first radio terminal to the second radio terminal, (a) a second radio control channel information, or (b) the second radio control channel information and a data channel; and
   receiving, by the first radio terminal from the second radio terminal, feedback information or a shared channel at an interval later than a last symbol of the second radio control channel information or the data channel, wherein the interval is determined according to the first radio control information and the second radio control information.

2. The wireless communications method of claim 1,
   wherein the first radio control channel information includes one or more values for one or more parameters; and
   wherein the second radio control channel information excludes the one or more parameters or includes the one or more values.

3. The wireless communications method of claim 2, wherein the one or more parameters include a modulation and coding scheme (MCS) for the shared channel.

4. The wireless communications method of claim 2, wherein the one or more parameters includes a redundancy version (RV).

5. The wireless communications method of claim 2, wherein the one or more parameters includes precoding and a number of layers.

6. The wireless communications method of claim 2, wherein the one or more parameters includes a resource size allocated to the shared channel.

7. The wireless communications method of claim 6, wherein the shared channel is a physical uplink shared channel (PUSCH).

8. The wireless communications method of claim 1, wherein the first radio control channel information or the second radio control channel information is in a physical downlink control channel (PDCCH).

9. The wireless communications method of claim 1, wherein the first radio control channel is a radio resource control (RRC) signaling.

10. The wireless communications method of claim 1,
    wherein the first control channel information indicates resource information for resources available for transmitting the second radio control channel information.

11. The wireless communications method of claim 10, wherein the resource information includes a time-frequency resource.

12. The wireless communications method of claim 10, wherein the resource information includes candidate control channel information.

13. The wireless communications method of claim 10, wherein the resource information includes control channel element (CCE) resource information.

14. The wireless communications method of claim 10, wherein the resource information includes resource element group (REG) information.

15. A wireless communications method, comprising:
    receiving, at a second radio terminal from a first radio terminal, a first radio control channel information;
    receiving, at the second radio terminal from the first radio terminal, (a) a second radio control channel information, or (b) the second radio control channel information and a data channel; and
    transmitting, from the second radio terminal to the first radio terminal, feedback information or a shared channel at an interval later than a last symbol of the received second radio control channel information or the data channel or payload data, wherein the interval is determined according to the first radio control channel information and the second radio control channel information.

16. The wireless communications method of claim 15,
    wherein the first radio control channel information includes one or more values for one or more parameters; and
    wherein the second radio control channel information excludes the one or more parameters or includes the one or more values.

* * * * *

UNITED STATES PATENT AND TRADEMARK OFFICE
CERTIFICATE OF CORRECTION

| | | |
|---|---|---|
| PATENT NO. | : 12,113,743 B2 | Page 1 of 1 |
| APPLICATION NO. | : 17/369156 | |
| DATED | : October 8, 2024 | |
| INVENTOR(S) | : Shuaihua Kou et al. | |

It is certified that error appears in the above-identified patent and that said Letters Patent is hereby corrected as shown below:

In the Claims

In Claim 15, Column 14, Line 50 – please delete "or payload data"

Signed and Sealed this
Twenty-fifth Day of March, 2025

Coke Morgan Stewart
*Acting Director of the United States Patent and Trademark Office*